US005354166A

United States Patent [19]

De Crane

[11] Patent Number: 5,354,166

[45] Date of Patent: Oct. 11, 1994

[54] LEANING TRANSFER DEVICE

[76] Inventor: Charles E. De Crane, 802 Janna St., West Monroe, La. 71291

[21] Appl. No.: 947,580

[22] Filed: Sep. 21, 1992

[51] Int. Cl.[5] .......................... B65G 9/00; B66C 5/00; B66C 11/12

[52] U.S. Cl. .................................... 414/561; 212/219; 212/220; 222/185

[58] Field of Search ............... 414/403, 422, 560, 561; 222/105, 181, 185, 93; 212/218, 219, 220

[56] References Cited

U.S. PATENT DOCUMENTS

| | | | |
|---|---|---|---|
| 2,343,014 | 2/1944 | Langan | 212/218 |
| 4,160,617 | 7/1979 | Montgomery et al. | 212/219 X |
| 4,527,716 | 7/1985 | Haas et al. | 222/181 X |
| 4,599,027 | 7/1986 | Knapp | 414/561 X |
| 4,863,065 | 9/1989 | De Crane | 222/185 X |
| 4,966,311 | 10/1990 | Taylor | 414/403 X |
| 5,184,759 | 2/1993 | Gill et al. | 222/181 |
| 5,257,725 | 11/1993 | Volk, Jr. et al. | 222/185 |

OTHER PUBLICATIONS

Literature–Custom Equipment Design–4 pages Entitled "Operating a Discharge Hopper Used to be a Dirty Job".

Literature–Custom Equipment Design–1 page Showing Equipment Lifting Large Bulk Bag.

*Primary Examiner*—Michael S. Huppert
*Assistant Examiner*—Stephen Gordon
*Attorney, Agent, or Firm*—Norvell E. Von Behren; Michael A. Capraro

[57] ABSTRACT

A new and novel transfer device of the type used to move heavy filled bulk containers from a location outside of the transfer device to a position within the transfer device and above a base footprint of the transfer device where the filled bulk container can then be evacuated. The transfer device is constructed so that the frame is not perpendicular to the surface or substrate on which it is positioned. A heavy filled bulk container located outside the frame work of the transfer device can then be lifted by the transfer device without creating overturning and uplifting moments on the transfer device. When the filled bulk container is then moved to a position inside the framework and above the base foot print, the base footprint operates to maintain load stability on the frame of the transfer device.

9 Claims, 3 Drawing Sheets

LEANING TRANSFER DEVICE

CROSS REFERENCE TO RELATED APPLICATIONS

U.S. Design patent application Ser. No. 07/902,587, filed Jun. 22, 1992 by Charles E. De Crane and entitled Leaner Discharge Unit and issued on Apr. 19, 1993 as U.S. Pat. No. D346,253.

BACKGROUND OF THE INVENTION

This invention relates generally to filled bulk container transfer devices and more specifically to a new and improved filled bulk container transfer device permitting the safe translocation of heavy filled bulk containers from a location outside of the transfer device to a position within a base footprint of the transfer device, defined by anchoring points of the transfer device, where the filled bulk container can then be evacuated.

Large containers for the shipment of bulk material from one location to another have a capacity ranging from twenty cubic feet up to seventy-cubic feet and weighing from 700 to 3,300 pounds or more. With the introduction of large bulk containers, former methods of moving and evacuating them were displaced with transfer devices. Since the filled bulk containers can weight as much as 4,000 pounds, prior art transfer devices soon encountered problems with load stability and support.

Typical prior art transfer devices, as shown in FIGS. 1-3 of the drawings, were constructed in a manner where vertical frame members were anchored by securing base anchoring plates to a concrete floor or similar level horizontal surface. The upper portion of the transfer device had fixedly attached thereto a cantilevered beam which carried a movable lifting means whereby the filled bulk containers could be lifted from the floor or other surface and moved to a point inside the framework of the transfer device where the bulk container could then be evacuated.

The cantilevered beam was fixedly attached to the upper frame of the transfer device so that a portion of the cantilevered beam extended beyond the framework at the front of the transfer device. This allowed the operator to move the lifting means to the end of the cantilevered beam beyond the framework of the transfer device to a position above the filled bulk container which rested on the floor or a pallet. The operator could then connect the lifting means to the bulk container and activate the lifting means thus lifting the bulk container from the floor. At this point the entire weight of the bulk container would be located outside of, but supported by, the framework of the transfer device. This displaced weight caused a tremendous overturning moment on the vertical frame members of the transfer device and an upward moment or uplifting force on the rear base anchoring points of the vertical frame members. The resulting stress could cause the separation of the vertical frame members from the base anchoring plates or the separation of the base anchoring plates from the substrate.

The load stability of the transfer device when bearing the weight of a filled bulk container located outside of the framework depended on the stability of the joint where the vertical frame members were attached to the base anchoring plates, the anchoring means used to secure the base anchoring plates to the substrate and the integrity of the substrate into which the anchors were placed. An extremely heavy filled bulk container could easily overturn a transfer device by the overturning and uplifting moments created when initially lifting the bulk container from its resting place if the anchor design or the integrity of the frame member to anchor base plate joint failed for various reasons.

FIGS. 1, 2 and 3 of the drawings show the typical prior art transfer device with a filled bulk container located both inside and outside of the transfer device. FIG. 3 shows how the force of the downward weight of the filled bulk container creates an overturning moment on the transfer device and an upward moment or uplifting force at the base anchoring points of the vertical frames in the direction of the arrows as shown. These will be discussed more fully hereinafter in the Description of the Preferred Embodiment.

SUMMARY OF THE INVENTION

To overcome the before described considerations and problems inherent in an encountered with prior art transfer devices, there is provided by the subject invention a unique transfer device. The new and novel transfer device construction permits the lifting of heavy filled bulk containers located outside the framework of the transfer device without creating an unsafe overturning and uplifting moment on the framework and at the anchor points of the transfer device.

To alleviate the overturning and uplifting moments created by the weight of the filled bulk container when it is initially lifted by the transfer device, applicant's new and novel transfer device utilizes angled construction of the various frame members. By fixedly attaching the various frame members at an angle to the base anchor plates, applicant's new and novel transfer device abates the overturning and uplifting moments created by the weight of the filled bulk container when it is initially lifted by the transfer device. The angle of the frame members, defined by the relation of the frame members to the substrate, is opposite to the direction of the cantilevered beam extending beyond the framework at the front of the transfer device. Thus, when a filled bulk container is lifted by the lifting means attached to the cantilevered beam, the angle of the frame members counteract or neutralize the overturning and uplifting moments created by the downward weight of the filled bulk container to thereby offset that weight.

Once the filled bulk container has been safely lifted from the floor or pallet, it can then be transferred by the movable lifting means along the cantilevered beam to a position inside of the transfer device. This position is determined by the base footprint of the transfer device. The base footprint is defined by the points where the frame members are attached to the base anchor plates. By positioning the filled bulk container within and above the area defined by the base footprint, load stability of the transfer device is maintained while the container is positioned within the structure of the frame.

Accordingly, it is an object and advantage of the invention to provide a new and novel transfer device which permits the safe translocation of heavy filled bulk containers from a location outside of the transfer device to a position within the transfer device where the filled bulk container can then be evacuated by various known methods.

Another object and advantage of the invention is to provide load stability of the transfer device when lifting filled bulk containers from a position outside the framework of the transfer device.

Still another object and advantage of the invention is to provide a new and novel transfer device that will maintain load stability on the frame when a filled bulk container is positioned within and above the base footprint of the transfer device and while the container is being evacuated.

These and other objects and advantages will become apparent from review of the drawings and from a study of the Description of the Preferred Embodiment relating to the drawings which has been provided by way of illustration only.

BRIEF DESCRIPTION OF THE DRAWINGS

FIG. 3 also shows the downward weight of the filled bulk container, the overturning moment on the transfer device and the uplifting force on the anchor points.

FIG. 4 also shows a filled bulk container being lifted at a position outside of the framework of the transfer device and further showing the lack of overturning or uplifting moments on the frame structure or the base plates of the device.

DESCRIPTION OF THE PREFERRED EMBODIMENT

Figure 1:
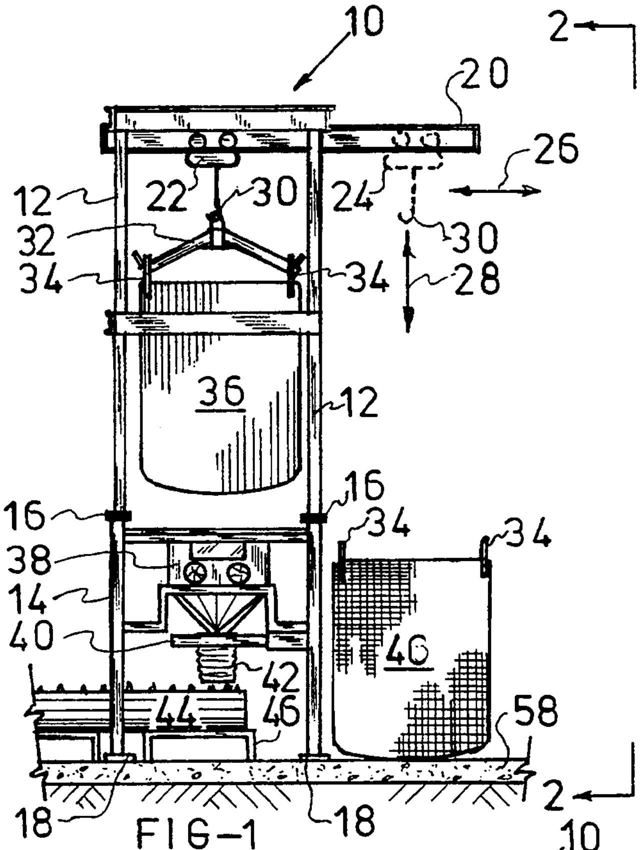
FIG-1 PRIOR ART
FIG. 1 is a left side elevational view of a typical prior art type transfer device showing a filled bulk container positioned within the transfer device and showing a second filled bulk container positioned in a ready position prior to being lifted.

Referring to the drawings in general and in particular to FIG. 1 of the drawings, there is shown a prior art transfer device generally by the numeral 10. The transfer device is constructed with an upper frame 12 formed from a plurality of upstanding legs and a lower frame 14 also formed from a plurality of upstanding legs.

The upper frame 12 and the lower frame 14 are fixedly attached together by the plurality of flanges 16 with bolts or other known fastening means. At the bottom of the lower frame 14 are base plates 18 which are welded to the lower frames 14 by means known in the art. The base plates 18 generally are bolted or secured by various means to the concrete substrate 58 where the transfer device 10 is positioned.

Positioned at the top of the transfer device is a cantilevered beam 20 upon which is positioned lifting means 22 in the form of a trolley lift of the type known in the lifting art. In FIG. 1 the lifting means 22 is shown in the inner position within the transfer device and is also shown in dotted lines by the numeral 24 in the outer position on the cantilevered beam 20. When constructed thusly the lifting means is designed for horizontal travel in the direction shown by arrow 26 and has the ability to raise and lower bulk containers such as the bulk bags 36 and 48 in the direction shown by the arrow 28.

The vertical lifting of the bulk bags is accomplished by using a lifting hoist hook 30 and a lifting adapter spreader bar 32 of the type which is designed to hold and release a plurality of bag loops 34 fixed to the top of a bulk bag 36.

When the prior art transfer device 10 is used for lifting and moving bulk bags 36, it is often desirable to use a discharge hopper 38 which may be positioned where shown in FIG. 1. The discharge hopper is used to receive the contents of the bulk bag and pass the contents on through to a metering valve 40 and ultimately to a discharge chute 42. The bulk product may then be discharged into an auger conveyor 44 which sits on top of an auger frame 46. The discharge may also be made into a belt conveyor or other types of conveying means known in the conveying art.

In FIG. 1, there is also shown a second bulk bag 48 which is positioned at the base of the transfer device and outside of the frame structure. The second bulk bag 48 will then be raised upwardly by the lifting hoist hook 30 after the first bulk bag 36 has been emptied and disposed of.

Figure 2:
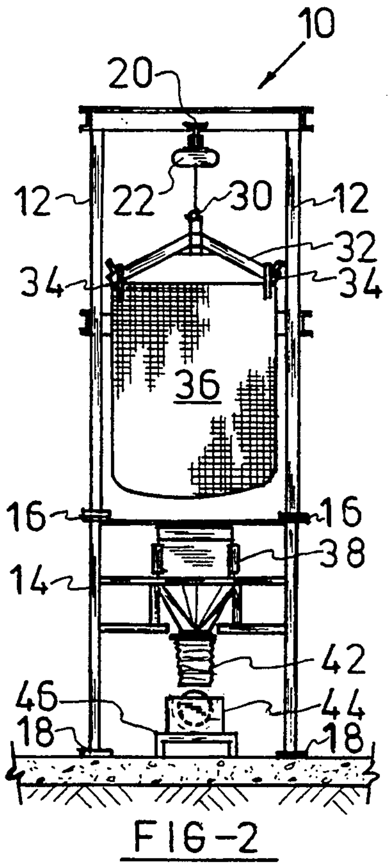
FIG-2 PRIOR ART
FIG. 2 is a front elevational view taken along lines 2—2 of FIG. 1.

Referring now to FIG. 2 of the drawings there is shown a front elevational view, taken along lines 2—2 of FIG. 1, showing in more detail the construction of a typical prior art transfer device. It should be noted that in FIG. 2 the second bulk bag 48 has not been shown for purposes of clarity.

Figure 3:
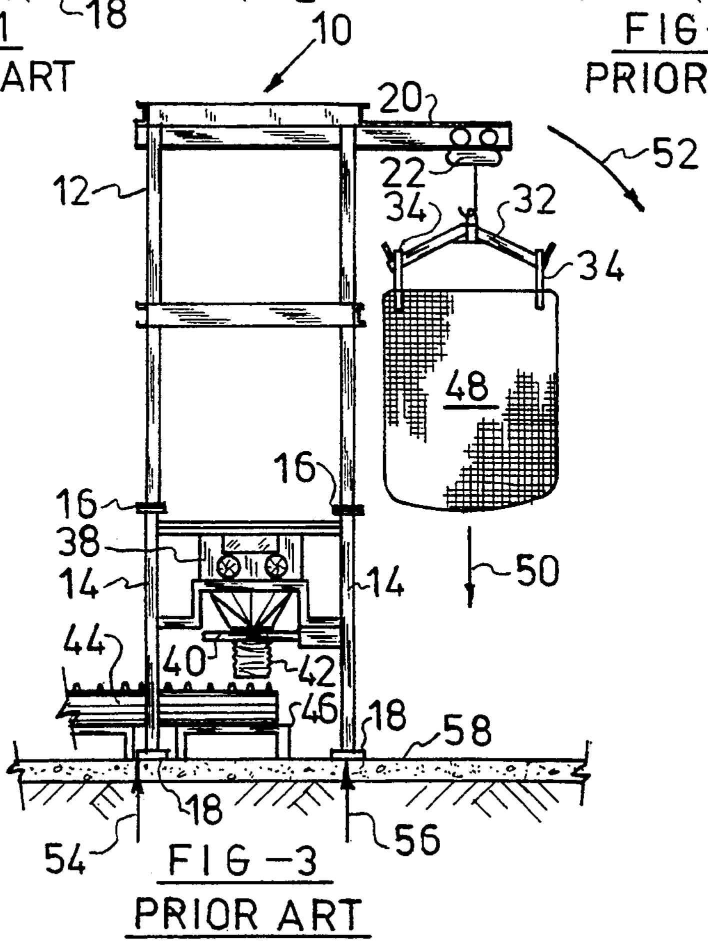
FIG-3 PRIOR ART
FIG. 3 is another left side elevational view of the prior art transfer device of FIG. 1 showing the second filled bulk container being lifted at a position outside of the framework of the transfer device.

Referring now to FIG. 3 of the drawings there will be described in detail the problems inherent in prior art transfer devices shown in FIGS. 1 and 2. The typical prior art transfer device 10 was constructed so that the plurality of upstanding legs of the lower frame 14 were welded perpendicularly to the base plates 18 by means known in the art. The base plates 18 could then be anchored to the substrate 58 by means known in the art. The resulting angle of the plurality of upstanding legs of the lower frame 14 to the base plates 18 was 90 degrees.

After a transfer device 10 had been secured to the floor or other substrate 58, an operator could move the lifting means 22 to the end of the cantilevered beam 20 beyond the framework of the transfer device 10 to a position above the filled bulk container 48 which rested on the floor 58 or a pallet. The operator could then connect the lifting means 22 to the bulk container 48 by the lifting hook 30 or by using a lifter adapter 32 to catch bulk bag loops 34 and then connect the lifter adapter 32 to the lift hook 30 as shown in FIG. 3. The operator could then activate the lifting means 22 thus lifting the bulk container 48 from the floor 58 in an upward direction.

When the filled bulk bag 48 is lifted from the concrete floor 58 by the lifting means 22, the downward weight of the filled bulk bag 48, shown by the arrow 50, shifts the center of gravity of the transfer device 10 from a point within the framework of the transfer device 10 to a point located outside of the framework and near the bulk container 48. The shift in the center of gravity of the transfer device 10 creates an outwardly and downwardly force on the cantilevered beam 20 resulting in an overturning moment on the transfer device 10 in the direction shown by the arrow 52. Additionally, the shift in the center of gravity of the transfer device 10 creates an upwardly force on the anchoring bolts at the base plates 18 in the direction shown by the arrows 54 and 56.

The resulting stress of the shift of the center of gravity of the transfer device 10 on the joints where the lower frame 14 is welded perpendicularly to the base plates 18 can cause the joints to separate or fracture. The net effect of this may result in the loss of support of the bulk container 48 by the transfer device 10 causing the transfer device 10 to overturn in the direction of the arrow shown by numeral 52. This could then be a safety hazard to workers in the area.

The resulting stress of the shift of the center of gravity of the transfer device 10 on the anchoring means employed to secure the base plates 18 to the substrate 58 may also cause the anchoring means to shear or fracture from the uplifting tensile forces 54 and 56. One common method of anchoring the transfer device 10 to a concrete substrate 58 is through the use of special tempered fastening systems utilizing bolts that screw into a specially designed concrete anchor that has been embedded into the concrete substrate 58. With the wide spread sale and distribution of inferior imported bolts and fastening devices, the rate of bolt failure is exceptionally high.

Also, an inferior substrate will weaken or disintegrate under the force of the upward moment created by the shifting center of gravity in the transfer device 10 when a filled bulk container 48 is being lifted. This stress at the anchoring means can cause the anchoring means to become separated from the substrate allowing the weight of the filled bulk container 48 to overturn the transfer device 10 in the direction of the arrow shown by numeral 52.

These events could lead to costly down time for repairs or replacement of the transfer device 10 and, more importantly, could result in injury to the operator or others as well as damage to other equipment and property.

Figure 4:
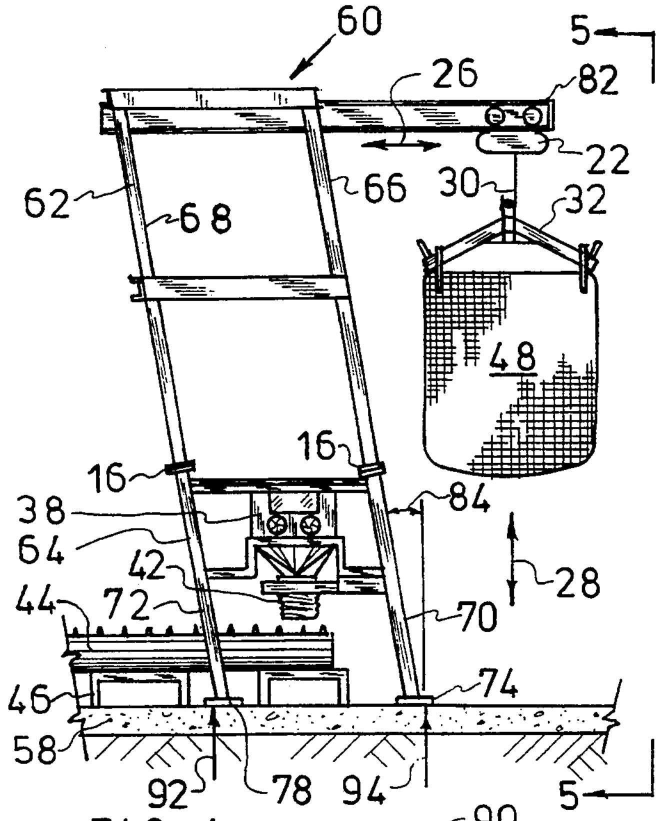
FIG. 4 is a left side elevational view of applicant's new and novel transfer device showing the angled frame members.
Figure 5:
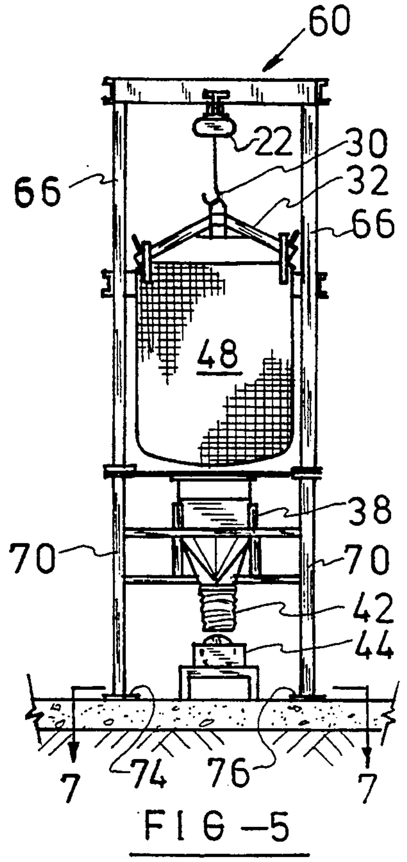
FIG. 5 is front elevational view taken along the lines 5—5 of FIG. 4.
Figure 6:
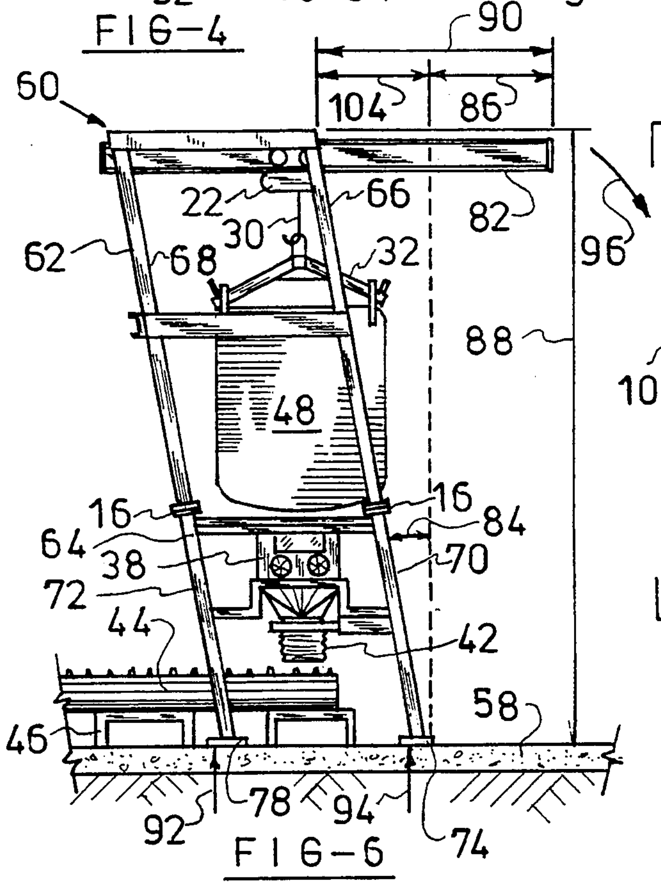
FIG. 6 is a left side elevational view of applicant's new and novel transfer device showing a filled bulk container positioned inside of the device and over the base footprint of the transfer device.

Accordingly, applicant's new and novel transfer device, shown generally by the numeral 60 in FIGS. 4–6 of the drawings, was designed to overcome these undesirable considerations.

Referring now to FIG. 4, the applicant's transfer device, shown generally by the numeral 60, is constructed with an upper frame 62 formed from a plurality of front inclined legs 66 and a plurality of rear inclined legs 68 and a lower frame 64 also formed from a plurality of front inclined legs 70 and rear inclined legs 72.

The bottom of the front inclined legs 70 and the rear inclined legs 72, of the lower frame 64, have fixedly attached thereto a plurality of base plates 74, 76, 78 and 80. The base plates 74, 76, 78 and 80 are fixedly attached to the front inclined legs 70 and the rear inclined legs 72 of the lower frame 64, by means known in the art, so that the angle of the plurality of lower frame inclined legs 70 and 72 to the base plates 74, 76, 78 and 80 is in a manner that results in the transfer device 60 forming an angle 84, ranging approximately from 5 to 15 degrees, to the perpendicular intersect of the concrete floor or substrate 58 at the point where the base plates 74 and 76 are anchored by means known in the anchoring art. The leading angle 84 of the entire transfer device 60, in the Preferred Embodiment shown for a particular bag weight and size, has been designed to be approximately 10° 15′ to provide the new and novel desired result. In the Preferred Embodiment shown, a bag of 30 cubic feet weighing approximately 2200 pounds will be able to be easily lifted without detrimental stress on the anchoring bolts or on the frame structure. Other angles for the tilt or lean of the transfer device 60 are considered to be within the spirit and scope of the applicant's invention.

The upper frame 62 and the lower frame 64 are fixedly attached together by a plurality of flanges 16 with fastening means known in the art. The height 88 of a typical transfer device 60, from the concrete surface or substrate 58 to the upper most point of the upper frame 62, may range from 12–20 feet. The height, in the Preferred Embodiment illustrated for a particular bag weight and size, has been designed to be approximately 13 feet to provide the new and novel desired result. Other frame configurations are considered to be within the spirit and scope of the applicant's invention.

A cantilevered beam 82 is fixedly attached to the upper frame 62 as shown so that the cantilevered beam 82 is substantially parallel to the concrete surface or substrate 58 on which the inclined novel transfer device 60 rests. A portion, shown by the arrow 86, of the cantilevered beam 82 extends beyond the lower front inclined legs 70 of the lower frame 64 to provide the necessary amount of horizontal travel of the lifting means 22 on the cantilevered beam 82.

The length 90 of the cantilevered beam 82, from the front of the uppermost portion of the transfer device 60 to the end of the cantilevered beam 82, in the Preferred Embodiment shown for a particular bag weight and size, has been designed to be approximately 5 feet to provide the novel desired result. Other constructions of the cantilevered beam 82 are considered to be within the spirit and scope of the applicant's invention.

A lifting means 22 in the form of a trolley lift of the type known in the lifting art is positioned on the cantilevered beam 82. When constructed in this manner, the lifting means is designed for horizontal travel along the length of the beam as shown by the arrow 26. In FIG. 4, the lifting means 22 is shown in the outer position on the cantilevered beam 82. When in the outer position, the lifting means can vertically raise and lower bulk containers such as the bulk bag 48 as shown by the arrow 28 without causing increased tension and compression forces 92 and 94 on the bolts. This also results in minimizing the overturning moment 96 on the applicant's novel design.

The vertical raising and lowering of the bulk container is accomplished by using a lifting hoist hook 30 and a lifting adapter spreader bar 2 which holds the loops that are affixed to the bulk bag 48. FIG. 4 shows the bulk bag 48 in a raised position and ready for horizontal movement into the frame structure.

When using applicant's new and novel transfer device 60, it may be desirable to position a discharge hopper 38, of the type previously described, where shown in FIG. 4. The discharge hopper is used to receive the contents of the bulk container and to pass the contents through a discharge chute 42 into an auger conveyor 44 which sits on top of an auger frame 46. Other types of discharge hoppers may be used and reference should be made to the applicant's U.S. Pat. No. 4,863,065 for a more complete understanding of these types of devices.

The position of the discharge hopper 38, in the Preferred Embodiment shown for a bulk container containing particular product, was designed to provide the new and novel desired result. It is also within the spirit and scope of the applicant's invention that the transfer device 60 may be used without a discharge hopper when lifting other than large bulk bags of the type shown. These modifications to the transfer device structure are also considered to be within the spirit and scope of the applicant's invention.

Referring now to FIG. 5 of the drawings there is shown a front elevational view, taken along line 5—5 of FIG. 4, showing in more detail the construction of applicant's new and novel transfer device. For purposes of clarity, the various structural bracing and cross-bracing of the frame members has been omitted.

Figure 7:
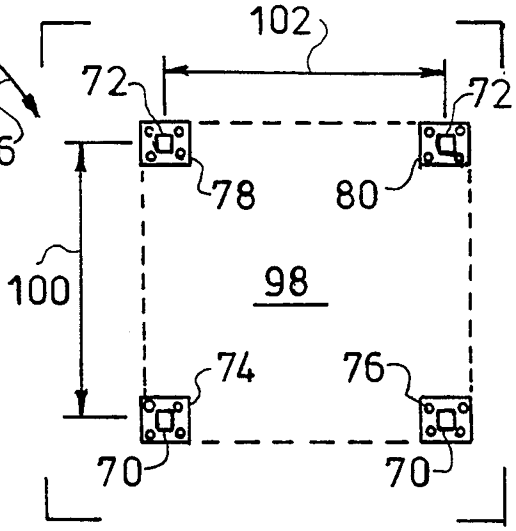
FIG. 7 is a cross-sectional view taken along lines 7—7 of FIG. 5 of the base footprint of applicant's new and novel transfer device.

Referring generally now to FIGS. 6 and 7 of the drawings, there will be described in detail how applicant's new and novel transfer device 60 overcomes the problems inherent in the prior art transfer devices. Referring now to FIG. 6 of the drawings, there is shown the applicant's new and novel transfer device referred to generally by the numeral 60.

The transfer device 60 is secured to the concrete surface or substrate 58 by anchoring the base plates 74, 76, 78 and 80 to the concrete surface or substrate 58 by means known in the art. Each point where the base plates 74, 76, 78 and 80 are anchored to the concrete surface or substrate 58 can be mapped out, the resulting pattern establishing the base footprint 98 of the transfer device 60, as shown generally in FIG. 7 of the drawings. FIG. 7 is a cross-sectional plan view taken along lines 7—7 of FIG. 6.

The base footprint 98 as shown in FIG. 7 has a quadrilateral shape measuring approximately 5′1″ from the front base plates 74 and 76 to the rear base plates 78 and 80, shown by the numeral 100, and measuring approximately 5′7″ from base plates 74 and 78 to base plates 76 and 80 respectively, as shown by the numeral 102. The shape and dimensions of the base footprint in the Preferred Embodiment are provided for particular bag weight and size to provide the desired novel result. Other shapes and dimensions of the base footprint are considered to be within the spirit and scope of the applicant's invention.

Referring now back to FIG. 6 of the drawings, since the pair of inclined legs 70 and 72 are fixedly attached to the base plates 74, 76, 78 and 80 in a non-perpendicular manner, the transfer device 60 acquires a tilt or angle 84 of 5 to 15 degrees from the perpendicular intersect of the concrete floor or substrate 58 when the transfer device is positioned on and anchored to the concrete floor or substrate 58.

The angle 84, in the Preferred Embodiment illustrated for a particular bag weight and size, has been designed to be approximately 10° 15′ to provide the new and novel desired result. Other angles as well as transfer device structural designs are considered to be within the spirit and scope of the applicant's invention.

The tilting or leaning construction of the transfer device 60 offsets the top portion of the transfer device 60 from the bottom portion thereof as shown by the numeral 104. Offsetting the top portion of the transfer device 60 from the bottom portion thereof, by causing the transfer device 60 to tilt or lean in the manner shown, places the center of gravity of the transfer device 60 at a point within the base footprint 98 that is closer to the anchoring points of the rear base plates 78 and 80.

Another effect of the offsetting construction of the transfer device 60 is that a portion 104 of the cantilevered beam 82 remains within the base footprint 98 of the transfer device 60. This configuration reduces the effect of the weight of the cantilevered beam 82 on the center of gravity of the transfer device 60 since a portion 104 of the weight of the cantilevered beam 82 is carried within the base footprint 98. The center of gravity of the transfer device 60 continues to remain near the rear base plates 78 and 80 and within the base footprint 98.

The lifting of the bulk container 48 on the outside of the frame as shown in FIG. 4, by the transfer device 60, creates a downward weight on the end of the cantilevered beam 82 shifting the center of gravity of the transfer device 60. Unlike prior art transfer devices as shown in FIGS. 1-3, the center of gravity of the applicant's new and novel transfer device 60 remains behind the base plates 74 and 76 and within the base footprint and does not shift beyond the front base plates 74 and 76 when the bulk container 48 is lifted as shown in FIG. 4, but remains within the base footprint 98 of the transfer device 60 because of the unique leaning configuration of the transfer device 60.

Accordingly, the tilt or lean of the transfer device 60 counteracts or neutralizes the overturning moment 96 and uplifting forces 92 and/or the forces at 94 created by the downward weight of the filled bulk container 48 to thereby offset that weight. Since the tilt or lean of the transfer device 60 keeps the center of gravity behind the front base plates 74 and 76 and within the base footprint, the subsequent addition of the weight of the bulk container 48, and thus the downward force of that weight, does not shift the center of gravity enough to create an overturning moment 96 or uplifting tension forces 92 and/or the forces at 94 on the transfer device 60. When the bag 48 is in the position shown in FIG. 4, it is believed that the forces 92 would be tension forces on the anchor bolts while the forces 94 would be compressive forces. When the bag 48 is in the position shown in FIG. 6, it is believed that both of these forces then become compressive forces.

Having been safely lifted, the heavy bulk container 48 can now be moved safely along the cantilevered beam 82 to a position within the framework of the transfer device 60 where the bulk container 48 can then be evacuated. The bulk container 48 is generally moved to a position over the discharge hopper 38 as shown in FIG. 6 of the drawings.

Placement of the discharge hopper 38 within the base footprint of the transfer device 60, retains the center of gravity within the base footprint of the transfer device 60 as the bulk container 48 is moved into the evacuation position as shown in FIG. 6. Thus, the load stability of the transfer device 60 is maintained and safety is enhanced.

Figure 8:
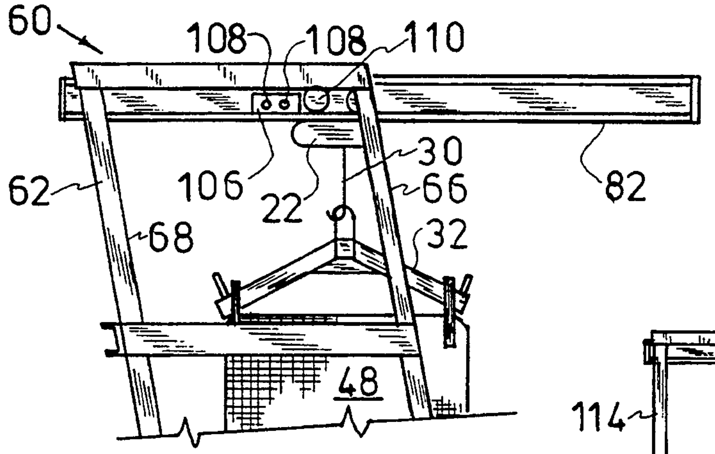
FIG. 8 is an enlarged top portion of the FIG. 6 view showing the mounting of a stop on the cantilevered beam used with the Applicant's Transfer Device.

Referring now to FIG. 8 of the drawings, there is shown an enlarged top portion of the FIG. 6 view. A stop 106 has been mounted in a pre-determined position on the cantilevered beam 82 by a plurality of bolts 108 to prevent the rear wheels 110 of the lifting means 22 from moving past the stop 106. The stop 106 may also be secured by other fastening means known in the art.

Figure 9:
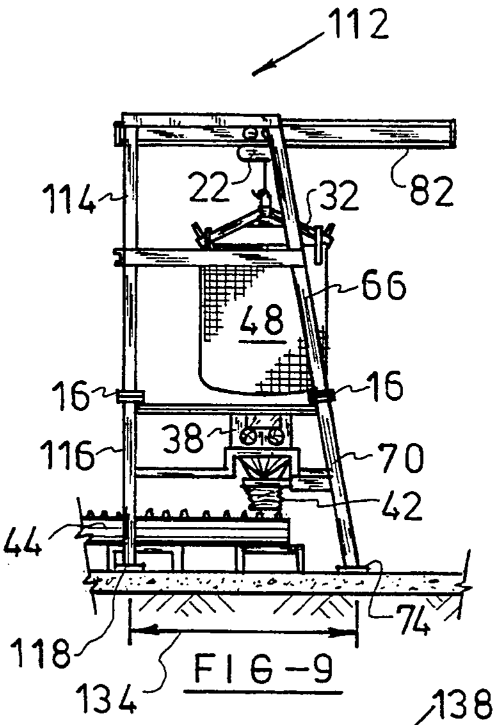
FIG. 9 is a left side elevational view, similar to the view of FIG. 6, showing a modified form of the Applicant's invention.

Referring now to FIG. 9 of the drawings, there is shown a left side elevational view, similar to the view of FIG. 6, showing a modified form of the Applicant's invention generally by the numeral 112. In the modification shown, an upper frame 114 and a lower frame 116 are attached together by the flanges 16. The lower frame 116 is attached to the base plate 118. When formed in this manner, the upper frame 114 and lower frame 118 are constructed generally vertical on both sides of the device and are not inclined in the manner that the upper front legs 66 and lower front legs 70 are constructed.

When constructed thusly the Applicant's modified device 112 functions in a manner similar to the preferred embodiment and has a larger base footprint than that of the preferred embodiment as can be seen by the arrow 134 which represents one side of the base for the footprint.

Figure 10:
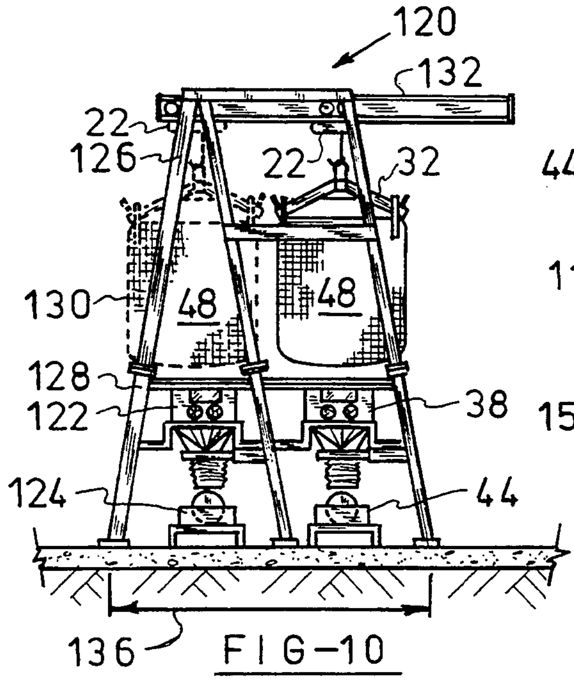
FIG. 10 is another left side elevational view, similar to the view of FIG. 6, showing another modified form of the Applicant's invention.

Referring now to FIG. 10 of the drawings, there is shown another left side elevational view, similar to the view of FIG. 6. This modification is shown generally by the numeral 120 and would be used when it is desirable to be able to provide a transfer device that can feed bulk product to at least two parallel auger conveyors 44 and 124 below the discharge hoppers 38 and 122. The embodiment shown in FIG. 10 is constructed similarly to the embodiment shown in FIGS. 4–7 with the addition of a rear inclined frame section consisting of an upper frame 126 and a lower frame 128. The rear inclined section is inclined towards the front of the transfer device as can be seen in FIG. 10 and not to the rear as in the preferred embodiment.

When constructed thusly, a second discharge hopper 122 can be mounted as shown to receive the bag 48 for discharge into this hopper. In FIG. 10, the bag position for discharge into the hopper 122 is shown by the dashed lines 130 and the bag position for the bag 48 when discharging into the discharge hopper 38 is shown in solid lines as in the preferred embodiment of FIGS. 4–7.

A cantilevered beam 132, similar to the cantilevered beam 82 of the preferred embodiment, may be constructed in a longer length as shown to permit the lifting means 22 to travel to the end of the beam in order to be able to dump bulk product into the additional discharge hopper 122. In addition, the FIG. 10 modification may have a trolley stop attached to the cantilevered beam 132 similar to the stop 106 shown in FIG. 8 or may have a flat plate welded to the end of the cantilevered beam 132 to serve as a stop.

The modification of FIG. 10 then provides a larger base footprint within the construction of the transfer device and functions similarly to the preferred embodiment. The numeral 136 shows the lengthened side of the transfer device which would be within the base footprint of the device.

Figure 11:
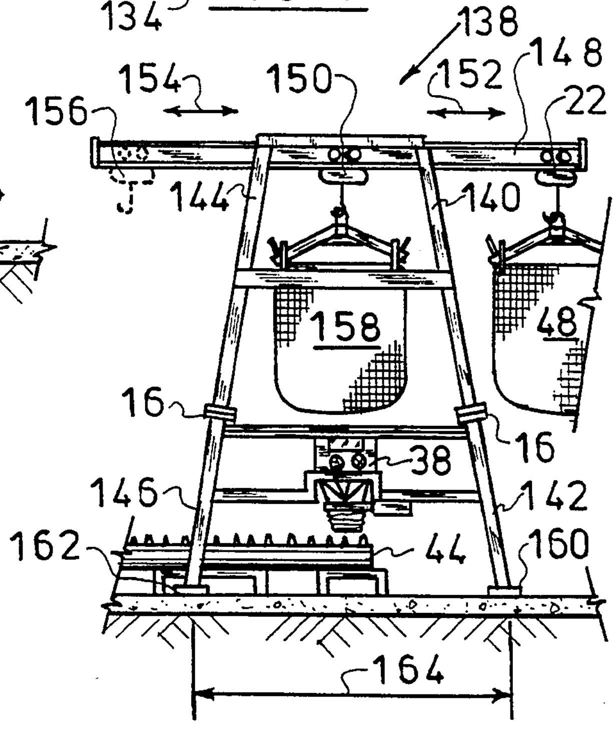
FIG. 11 is another left side elevational view, similar to the view of FIG. 6, showing still another modified form of the Applicant's invention.

Referring now to FIG. 11 of the drawings, there is shown another left side elevational view, similar to the view of FIG. 6, showing still another modified form of the Applicant's invention shown generally by the numeral 138. This modification would be used when it is desirable to be able to provide a transfer device that could have alternate hoists which would be used for a high discharge rate of bulk material to an auger conveyor 44 positioned below the discharge hopper 38 such as shown in FIG. 11.

The embodiment of FIG. 11 is constructed similarly to the embodiment shown in FIGS. 4–7 and also FIGS. 9–10 with the addition of inclined front and rear portions of the transfer device. The modified transfer device 138 is constructed with a pair of upper front inclined legs 140 and a pair of lower inclined legs 142, all of which are fixedly attached together by the flanges 16 as in the other embodiments. A pair of upper rear inclined legs 144 and a pair of lower rear inclined legs 146 are also fixedly attached together by flanges 16 as shown.

The front inclined legs 140 and 142 are inclined towards the rear inclined legs 144 and 146 while the rear inclined legs 144 and 146 are inclined towards the front inclined legs 140 and 142 by a pre-determined angle as in the before described embodiments. An extended elongated cantilevered beam 148 is fixedly attached to the modified transfer device 138 at the top thereof by welding or other known attaching methods and cantilevers or overhangs the front of the modified transfer device 138 as well as the rear of the transfer device as shown in FIG. 11.

When construction thusly, a second lifting means 150 is carried by the cantilevered beam 148 as well as the first lifting means 22 as shown in FIG. 11. The two lifting means 22 and 150 are then able to traverse along the cantilevered beam 148 in order to alternatively lift a pair of bulk bags 48 and 158 as shown. The first lifting means 22 than can move along the cantilevered beam 148 in the direction of the arrow 152 in and out of the transfer device from the front of the device to lift and carry the bulk bag 48. The second lifting means 150 then can move along the cantilevered beam 148 in the direction of the arrow 154 to move the bulk bag 158 and can also move to the outside of the transfer device to the rear of the device as shown by the dashed lines 156 which represent the lifting means 150 in the rear position.

When constructed thusly, the modified transfer device 138 can operate with the two hoists or lifting means 22 and 150 to provide a high discharge rate for the auger conveyor 44. The front and rear lower legs 142 and 146 are fixedly attached to the base plates 160 and 162 as in the previous embodiments which then forms a portion of the base footprint 164 shown in FIG. 11.

The embodiment shown in FIG. 11 may also be utilized with a pair of auger conveyor lines 44 and 124 which may be positioned as is shown in FIG. 10 of the drawings should that be desirable for a particular operation. When used thusly, the bags 48 and 158 could be loaded from both the front and the rear of the modified transfer device 138.

From the foregoing, it can be seen that there has been provided by the subject invention a new and novel bulk container transfer device permitting the safe translocation of heavy filled bulk containers from a location outside of the transfer device to a position within a base footprint of the transfer device.

The unique configuration of applicant's new and novel invention counteracts or neutralizes the overturning moment and uplifting forces created by the downward weight of a heavy filled bulk container to thereby safely offset that heavy weight. Since the center of gravity in the applicant's new and novel transfer device is initially located nearer to the rear base plates of the transfer device and because the tilt or lean of the transfer device keeps the center of gravity within the base footprint, the subsequent addition of the weight of a bulk container, and thus the downward force of that weight, does not shift the center of gravity outside of the base footprint enough to create an excessive overturning moment or excessive uplifting forces.

From the above it can be seen that the applicant's new and novel transfer device accomplishes all of the object's and advantages presented herein before. Nevertheless it is within the spirit and scope of the invention that changes in the applicant's basic device may be made and the Preferred Embodiment shown and described herein has only been given by way of illustration.

Having described my invention, I claim:

1. A transfer device including a substrate, the transfer device having a front portion and a rear portion, the device being used for transferring product contained in large bulk bags which are positioned outside of the front portion of the device to a position inside of the device where the bulk bags can be emptied to a lower conveying means which will convey the bulk product emptied from the bulk bags away from the transfer device, the transfer device being constructed without using a counterweight positioned opposite to the outside of the front portion of the device, comprising:

(a) a frame having at least four upstanding legs terminating at the base of the frame and forming a base footprint, the at least four upstanding legs being rigidly attached at the base of the frame to the substrate;

(b) a cantilevered lifting beam, fixedly attached to an upper portion of the frame and positioned partly inside of the frame and partly outside of the frame toward the front portion of the transfer device, the lifting beam being designed without using a counterweight which is positioned opposite to the cantilevered portion of the beam;

(c) lifting means, movably mounted on the lifting beam, for movement between the outside of the frame and the inside of the frame; and (d) the frame being constructed so that said at least for upstanding legs lean in the same direction upwardly from the base of the frame in a direction toward the rear portion of the transfer device at a predetermined angle, (1) the lean of said at least four upstanding legs of the frame in the same direction upwardly from the base of the frame being sufficient to offset the weight of a filled bulk bag carried by the lifting beam when said bag is positioned outside the front portion of the device to thereby eliminate need for a counterweight on the transfer device and to minimize overturning forces on the transfer device caused by the overhanging bulk bag when the bag is positioned outside of the device;

(2) the lean of said at least four upstanding legs of the frame as well as the base footprint being predetermined so that the bulk bag may be moved to the inside of the frame and may be discharged to a conveying means within the base footprint of the frame without overturning the frame.

2. The transfer device as defined in claim 1 wherein the lean of said at least four upstanding legs of the frame in the same direction upwardly from the base of the frame ranges from five degrees to fifteen degrees from vertical.

3. The transfer device as defined in claim 1 wherein the lean of said at least four upstanding legs in the same direction upwardly from the base of the frame is ten degrees from vertical.

4. The transfer device as defined in claim 1 further comprising a discharge hopper fixedly attached to said frame and positioned below the lifting means for use in positioning and containing the bulk bag being transferred by the lifting means.

5. The transfer device as defined in claim 1 wherein the center of gravity of the transfer device while holding a filled bulk bag inside of the device is contained within the base footprint of the device.

6. In a bulk bag transfer device including a substrate and which is designed without using a counterweight on the transfer device, the transfer device further including a frame, a cantilevered beam fixedly attached to an upper portion of the frame, and a moving means movably mounted on the beam for movement between a position outside the frame to a position inside the frame, the transfer device being used to transfer bulk product from a filled bulk bag which is positioned outside of the transfer device to a position inside of the transfer device using said cantilevered beam and said lifting means movably mounted on the cantilevered beam, the transfer device frame having in part at least four upstanding legs with base plates, said plates being rigidly attached to the substrate and forming a base footprint for the transfer device, the improvement comprising: the transfer device being constructed with said at least four upstanding legs having a predetermined incline in the same direction upwardly from the base plates, from a vertical position, to offset overhanging overturning weight from a transferred filled bulk bag while positioned outside of the transfer device and to distribute the weight of a transferred filled bulk bag within the base footprint while the filled bulk bag is positioned inside of the transfer device, the transfer device so designed thereby eliminating need for using a counterweight on the cantilevered beam.

7. The improvement as defined in claim 6 wherein the predetermined incline of said at least four upstanding legs of the transfer device inclined in the same direction upwardly from the base plates ranges from five to fifteen degrees from vertical.

8. The improvement as defined in claim 6 wherein predetermined incline of said at least four upstanding legs of the transfer device inclined in the same direction upwardly from the base plates is ten degrees from vertical.

9. A counterweight free transfer device including a substrate, the device being used for transferring the contents of a filled bulk material container from the container to a hopper that discharges bulk material onto a transporting device, comprising:

(a) an upstanding frame having a base portion rigidly attached to the substrate;

(b) a lifting beam fixedly attached to the frame, the lifting beam being positioned partially inside the frame and partially outside of the frame;

(c) a lifting means associated with the lifting beam for raising and lowering the filled bulk material container, the lifting means being designed without using a counterweight on the lifting means;

(d) a moving means attached to the lifting means to move the lifting means along the lifting beam so that the filled bulk material container can be moved along the lifting beam to a hopper located inside the frame; and (e) the upstanding frame comprising in part at least four frame members with said at least four frame members being inclined in the same direction upwardly from the base portion to a top of the frame, the at least four frame members being fixedly attached to said substrate and extending upwardly at said incline from the substrate.

* * * * *